Sept. 25, 1928.  R. V. OWEN  1,685,242

PEDOMETER

Filed Aug. 23, 1927   2 Sheets-Sheet 1

INVENTOR
Robert V. Owen
BY H. Lee Helms
ATTORNEY

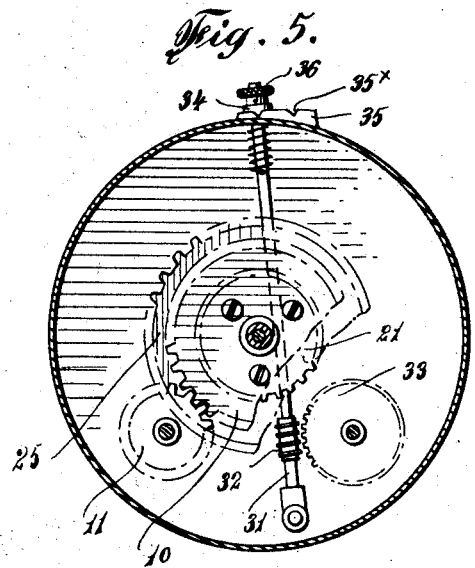
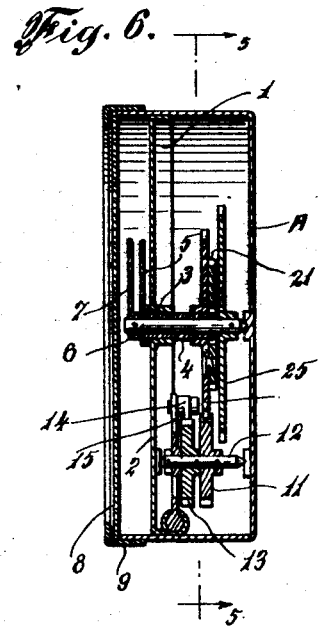
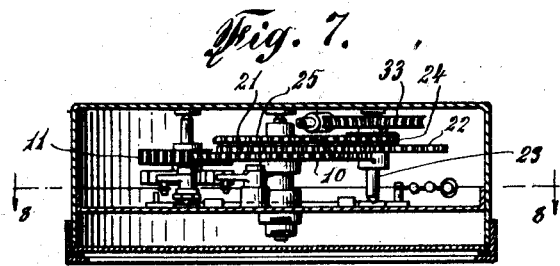
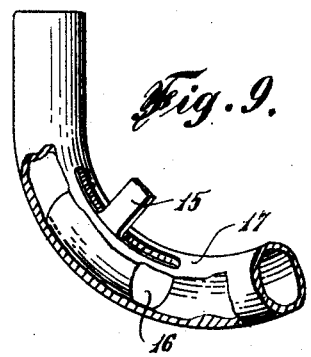
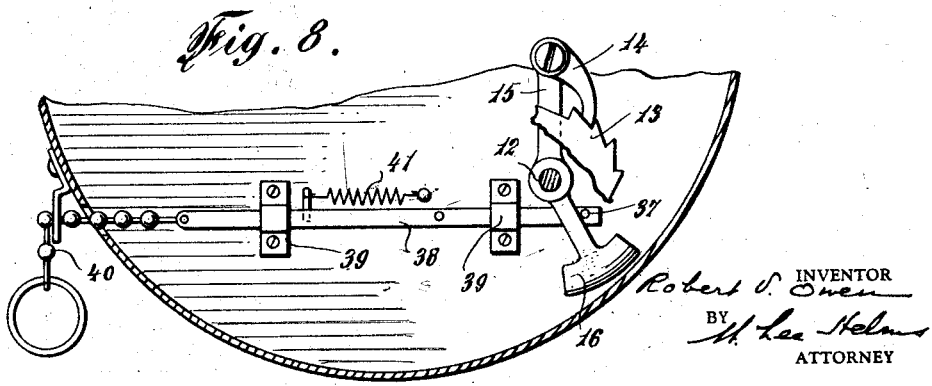

Patented Sept. 25, 1928.

1,685,242

UNITED STATES PATENT OFFICE.

ROBERT VAUGHAN OWEN, OF NEW YORK, N. Y.

PEDOMETER.

Application filed August 23, 1927. Serial No. 214,808.

This invention relates to means for measuring the distance traversed by a pedestrian and the object of the invention is to provide means which will be positive in action and so constructed as to withstand strong vibration. The device may be placed upon the ankle and its operative movements effected through the use of a weighted actuating member. The device comprises means for registering the total distance traversed and also divisions of that distance, or trips. The invention will be understood by reference to the accompanying drawings in which—

Figure 5 is a sectional elevation on the line 5—5, Figure 6;

Figure 6 is a sectional view of the line 6—6, Figure 3;

Figure 7 is a horizontal sectional view on the line 7—7, Figure 3;

Figure 8 is a fragmentary section on the line 8—8, Figure 7;

Figure 9 is a detailed view of the weight housing.

Figure 1:
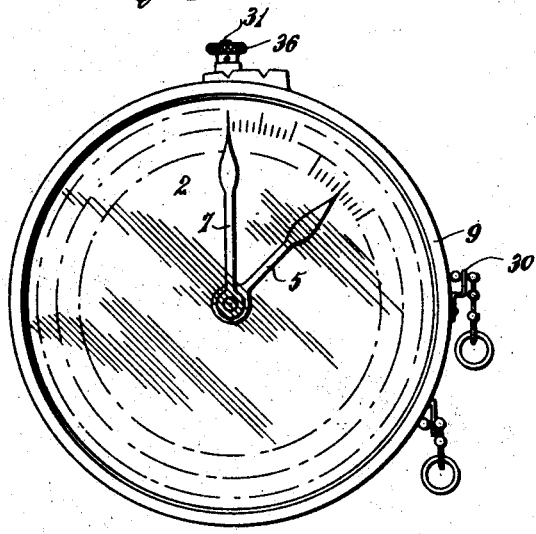
Figure 1 is a front elevation of an embodiment of the invention.
Figure 2:
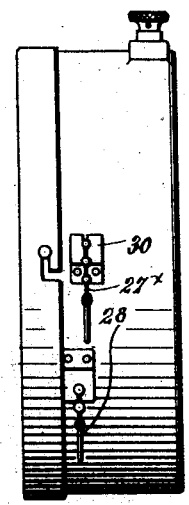
Figure 2 is a side elevation of the same.

The device consists of a casing A having set within a dial holder 1, which may have its front face formed with a dial 2, or the dial may be applied thereto separately. Dial holder 1 is formed with a flanged bearing member 3 to serve as a bearing support for the rotatable sleeve 4 which actuates indicating hand 5. Rotatable within sleeve 4 is the hand shaft 6 carrying indicating hand 7. Dial holder 1 may be protected by a glass 8, held in position on a casing by flanged member 9. Indicating hand 7 is, for each movement of the weighted actuating member later to be described, moved a greater distance than indicating hand 5. Hand 5 may be so related to the dial as in a complete rotary movement to indicate the traverse of one mile, whereas hand 7 may indicate in a complete revolution a traverse of 120 miles. The sleeve 4 upon which hand 7 is mounted carries a gear wheel 10, actuated by a pinion 11 on a short shaft 12. Shaft 12 carries a ratchet wheel 13 engaged by pawl 14, carried by a lever 15.

Figure 3:
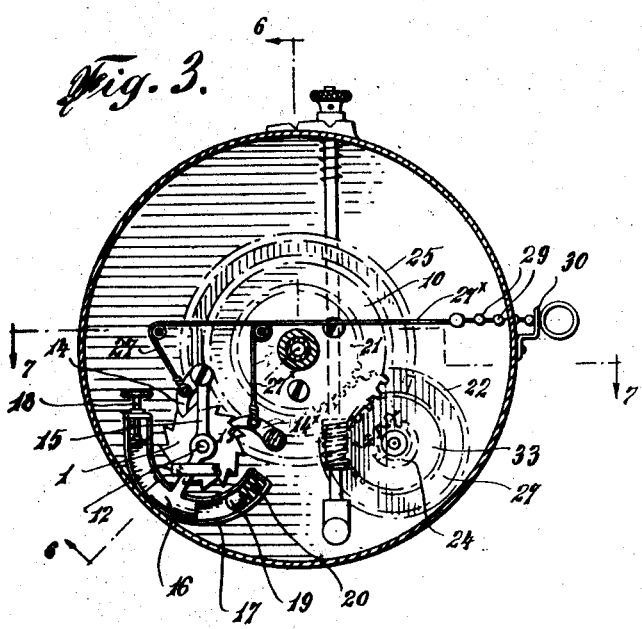
Figure 3 is a transverse section on the line 3—3, Figure 4.
Figure 4:
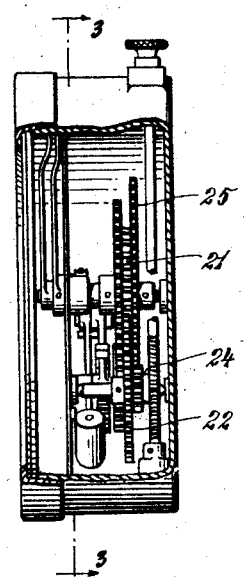
Figure 4 is a view similar to Figure 2 with the case broken away.

Mechanism at this point is best illustrated by Figure 3. Lever 15 is loosely mounted on shaft 12 and at its lower end carries a weight 16 moved within an arcuate housing 17. At the upper end of the housing is an adjustable stock device 18 adapted to limit the upward movement of weight 16. At the lower end of the arcuate housing, and within the same, is a steel ball 19 forwardly of a spring cushion member 20.

As stated above, the device may be secured to the leg of a pedestrian, and as the leg is moved forwardly ball 19 is caused to strike the weighted end of lever 15 so that the latter is thrown backwardly, pawl 14 slipping over the teeth of ratchet wheel 13 in accordance with the position of adjusting member 18. On the backward movement of the leg, weight 16, influenced by such movement, swings lever 15 back to initial position and pawl 14 advances ratchet wheel 13, the movement of shaft 12 causing, through pinion 11 and the gear wheel 10 a slight movement to indicating hand 5.

Through reduction gearing the movement of shaft 12 is transmitted to indicating hand 7. The said gearing comprises a gear wheel 21 carried by gear wheel 10, wheel 21 being in mesh with a wheel 22 carried by a shaft 23. Shaft 23 carries a small pinion 24 which drives a large gear wheel 25 fixed upon shaft 6. Re-setting mechanism is provided. To this end the pawl 14 and a latching pawl 14$^x$, both of which engage ratchet wheel 13, are connected by cables 27, 27$^x$ with a ring 28. When ring 28 is pulled outwardly, the pawls are withdrawn from the ratchet wheel. The cable 27 may be tied to cable 27$^x$ and the latter may be provided with the stops 29 in such manner that when the cable 27$^x$ is moved outwardly it may be held by engaging a stop plate 30. When the pawls are retracted, a pivoted shaft 31 (Figure 5) may be swung in such position that a worm 32 thereon will engage a worm wheel 33. To this end an endwise movable latch 34, of any usual construction, may be moved outwardly on rod 31 so as to be released from holding plate 35. When the rod is swung to interengage the worm and the worm wheel, latch 34 may be moved downwardly so that its holding portion may enter a groove 35$^x$. Upon rotation of thumb wheel 36 on the shaft, the latter will be rotated and the entire mechanism so actuated as to bring the indicating hands back to initial position.

In order to prevent operation of the pendulum and thus hold the device against actuation, I provide a holding pin 37 carried by a rod 38 slidably movable in the straps 39 and actuated in one direction, for locking, by a pull chain 40 and in an opposite direction, for releasing the pendulum, by a spring 41.

Having described my invention, what I claim and desire to secure by Letters Patent, it being understood that various modifications may be made in the form and arrangement of the elements illustrated in the drawings without departing from the spirit of the invention, is as follows:—

1. In pedometers, in combination with a casing, a distance indicating member and gearing for driving said member, a pendulum device for actuating said gearing and a striker for actuating said pendulum.

2. In pedometers, in combination with a casing, a distance indicating device, a gearing for driving said device, a pendulum for actuating said gearing, a raceway in which the pendulum is movable and a weight in said raceway and adapted to strike the pendulum for moving the same.

3. An actuating device for pedometers, comprising a rock lever provided with a pendulum, a raceway in which the pendulum is movable and a weight in said raceway and adapted to strike the pendulum for actuation thereof.

4. In pedometers, in combination with a casing, a distance indicating member, a gearing for driving said member, a ratchet wheel operatively connected to said gearing, a lever and pawl for actuating the ratchet member, a weight for actuating the pawl and lever, a raceway for the weight, and means for changing the effective length of the raceway for adjusting the length of movement of the lever.

In testimony whereof, I have signed my name to this specification.

ROBERT V. OWEN.